United States Patent Office 3,471,958
Patented Oct. 14, 1969

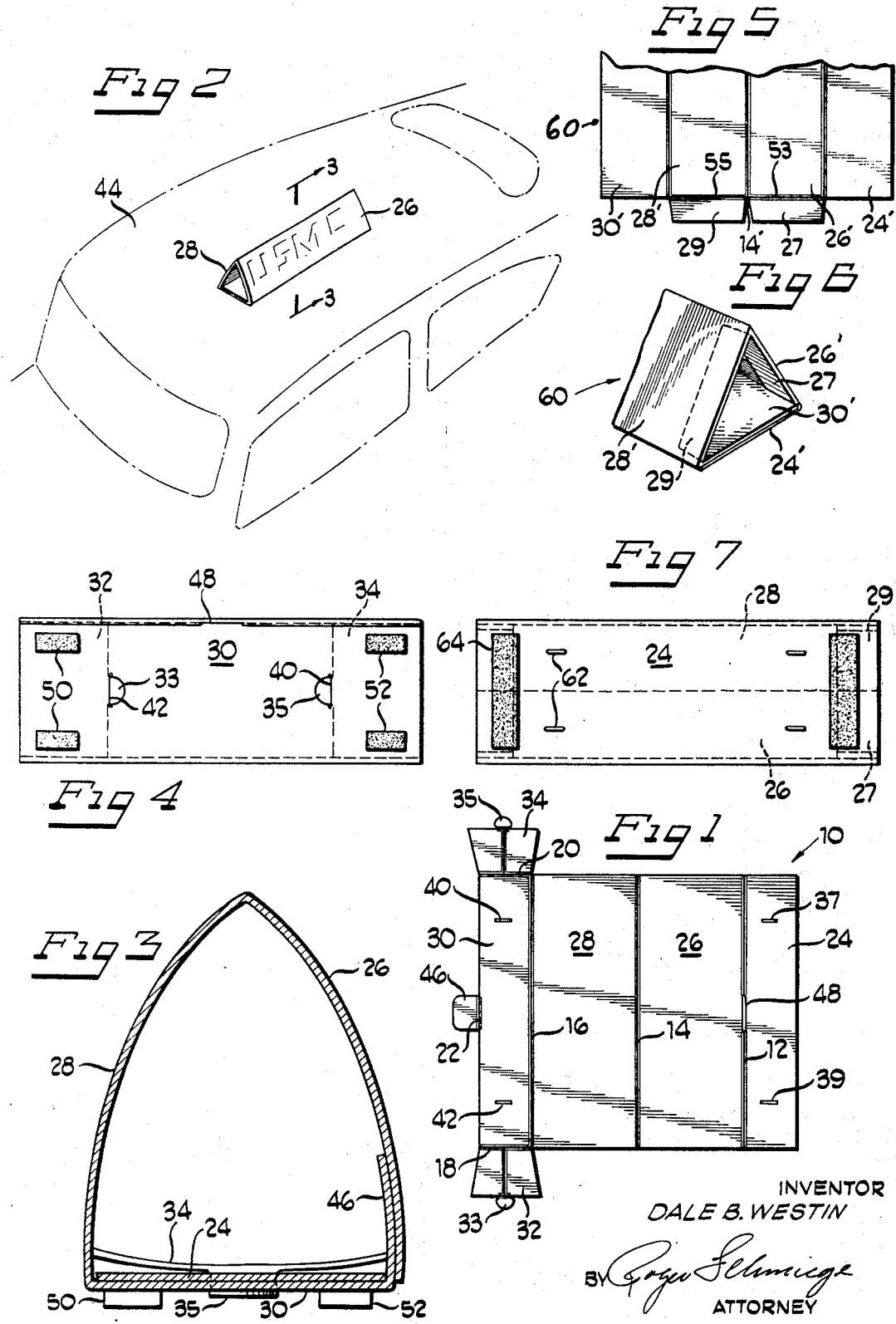

1

3,471,958
VEHICLE ADVERTISING DEVICE
Dale B. Westin, Naperville, Ill., assignor to Attention!
Inc., Wheaton, Ill., a corporation of Illinois
Filed Jan. 16, 1968, Ser. No. 698,232
Int. Cl. G09f 1/06
U.S. Cl. 40—129                    5 Claims

ABSTRACT OF THE DISCLOSURE

A vehicle advertising device of one-piece construction that may be printed, folded, and placed upon the top of a vehicle without requiring clamps, hooks or other mechanical retaining means to hold the advertising device in place thereon.

BACKGROUND

Prior to this invention, the majority of car top advertising devices required substantial mechanical apparatus to mount the device on the top of a vehicle such as a car, truck, bus or the like. The majority of these devices also required that the advertising indicia be applied to the advertising device either as a separate operation or through the use of a separate printed sheet. Many of the prior vehicle or car top advertising devices required that several cutting and fitting operations take place prior to assembling the device. Thus, these devices were very difficult to ship in that they were not capable of being easily packed in an assembled condition for shipment and could not be assembled with sufficient ease by the recipient to be shipped in an unassembled condition.

Generally, those devices constructed of several separate parts that were commercially available prior to this invention necessitated complex manufacturing and/or assembling procedures which prevented wide acceptance in the trade.

SUMMARY OF THE INVENTION

Briefly described, the present invention is directed to a generally triangular shaped car top advertising device that is of economical one-piece construction that lends itself to printing prior to or after assembly, has a simplified means of mounting on the top of a vehicle and does not require mechanical mounting means such as hooks, clamps, guy wires or the like to retain the device in place on the top of a vehicle. Also, the device does not require precision placement on a vehicle such as is normally required by mechanically attached apparatus.

The device may be shipped either in a flat, unassembled condition and may be assembled with ease at its destination. Alternatively, the device may be assembled and shipped in its assembled condition. The device of the present invention is imminently suited for use on the top of a vehicle, however, may be used on the trunk, fenders or placed in an advertising display.

The invention will be more clearly understood in conjunction with the drawings in which:

FIGURE 1 is a plan view of the car top advertising

2 device of this invention in a flat, unassembled condition showing the fold lines therein;

FIGURE 2 is a perspective view of the assembled advertising device shown in FIGURE 1 mounted on the top of a vehicle;

FIGURE 3 is a cross-sectional end view of that device shown in FIGURE 2 taken on lines 3—3 of FIGURE 2;

FIGURE 4 is a plan view of the base of that advertising device shown in FIGURES 1, 2 and 3;

FIGURE 5 is a fragmentary plan view of an alternative embodiment of the advertising device similar to that shown in FIGURES 1 through 4 in a flat, unassembled condition showing the fold lines therein;

FIGURE 6 is a fragmentary perspective view of that alternative embodiment shown in FIGURE 5; and FIGURE 7 is a plan view of the base of the alternative embodiment of the advertising device shown in FIGURES 5 and 6.

Referring more particularly to the drawings, FIGURE 1 shows a plan view of an advertising device generally designated as 10. As shown in FIGURE 1, the device is comprised of a sheet of cellulosic material such as paper; metal, plastic coated cellulosic material, thermoplastic polymers or copolymers or the like which has joining segments along fold lines 12, 14, 16, 18, 20 and 22 therein. Fold line 14 is a center line and serves as the apex of the triangular-shaped device when the device is fully assembled.

In order to construct the device, fold lines 12, 14 and 16 are utilized to divide the sheet into four segments, namely, segments 24, 26, 28 and 30. The segments are folded so as to provide two base members 24 and 30 (best shown in FIGURE 3), which overlap each other, i.e., base member 24 overlaps and lies upon base member 30 to provide a double thickness base on the device 10.

Base member 30 has extended end flap members 32 and 34 on either end thereof, which fold inwardly along lines 18 and 20 respectively. Flap members 32 and 34 are provided with tabs 33 and 35 which fit within slots 37 and 39 of member 24 and slots 40 and 42 of member 30 when the device is assembled as shown in FIGURE 3. In FIGURE 3, tab 35 is shown extending through members 24 and 30.

The fully assembled device is shown in perspective in FIGURE 2 on the top of a vehicle 44. The device is essentially an elongated triangular-shaped member wherein segments 26 and 28 serve as legs and join each other at an apex angle of approximately 45° and also join the base members at an angle of approximately 45°, such as shown in FIGURES 2 and 3. The external surface of the legs are adapted to bear advertising indicia such as shown in FIGURE 2.

Though the device is shown to be triangular in cross-section, the legs 26 and 28 are generally bowed as a result of flap members 32 and 34 being wedged against the legs 26 and 28. The extent of the bow in legs 26 and 28 is limited only by the ability to read indicia placed on the external sides of legs 26 and 28. As mentioned, advertising indicia may be placed on the surface of the device either before the device has been assembled or after assembly of the device or alternatively during manufacture thereof. As shown, the elongated triangular cross-section comprised of legs 26 and 28 and base members 24 and 30 is formed as an integral unit from one single sheet of material. The base members 24 and 30 are held together and the device is retained in a generally triangular shape, by tab members 33 and 35 on flaps 32 and 34 fitting within slots 37 and 39 of base member 24 and slots 40 and 42 of base member 30. Generally, only one base member need carry the flaps 32 and 34, however, it is within the ambit of this invention to have both base members carrying flaps. Also, as shown in FIGURE 3, there is a tab 46 on the exterior midsection of segment 30 which fits within slot 48 along crease line 12 of base member 24. Tab 46 provides greater rigidity to the base section of the device.

Also shown in FIGURE 3 are adhesive pads 50 and 52 at the base of the device for mounting the device on a vehicle. These pads are clearly shown in the plan view of the base of the device in FIGURE 4. The adhesive pads are generally foam rubber and have an adhesive coating on both sides thereof, i.e., the side attached to the base of the device as well as on the side adapted to be mounted on a vehicle top. The adhesive coating on the exterior side of the pad is generally protected by a piece of waxed paper or the like (not shown) prior to attachment of the device to a vehicle and the papers torn off to expose the adhesive layer at the time of attaching the device on the top of a vehicle.

The specific type of adhesives that may be utilized to bond the foam rubber to the device as well as to the top of a vehicle is not critical and commercially available rubber-based adhesives have been found suitable. Rubber-based adhesives are generally compositions containing a chlorinated hydrocarbon as the extending agent with a rubbery polymer or copolymer utilized as the bonding agent. Many commercially available rubber-based adhesives are useful in the bonding of the pads on the device of the present invention to the top of a vehicle and it is required that the adhesive be such that the pads be removable without damaging the surface to which the device is attached.

FIGURE 5 is a fragmentary view of an alternate embodiment of this invention in its flat, unassembled condition generally indicated as 60. There are segments 26' and 28' which are folded on lines 12', 14' and 16' similar to that of FIGURE 1, however, segments 26' and 28' have tab extensions 27 and 29 that fold back upon segments 26' and 28' along fold lines 53 and 55. The segments 24' and 30' may be of the same width as segments 26' and 28' (unlike that embodiment shown in FIGURES 1 through 4) and serve as the base portion of the device.

In FIGURE 6, the tabs 27 and 29 are folded upon segments 26' and 28' to provide a forward portion of device 60 with a double thickness to resist wind, etc. The base members 24' and 30' that are folded one upon the other and as shown in FIGURE 6 may be attached by means of a rubber-based adhesive or the like or, as shown in FIGURE 7, may be attached by staples 62.

The embodiment shown in FIGURE 7 has adhesive pads 64 similar to adhesive pads 50 and 52 of that embodiment shown in FIGURE 4, which adhesive pads extend laterally across the base rather than longitudinally as shown in FIGURE 4. The embodiments of FIGURES 5, 6 and 7 are not the preferred embodiment of this invention, however, may be utilized in given instances wherein the strength of the structure is relatively unimportant and where the surface on which the device is placed lends itself to the adhesive pads shown in FIGURE 7.

The advertising device of this invention may be constructed of cellulosic materials such as paper, plastic-coated cellulosics, i.e., plastic-coated paper; metal, thermoplastic polymers and copolymers as mentioned above, however, a paper stock coated with polyethylene, polypropylene, or polystyrene is preferred due to its economy and its ability to withstand wind, moisture and changing weather conditions.

The device of this invention may be placed on the top of a vehicle and remain attached thereto irrespective of the speed of the vehicle and may be removed and replaced without damaging the substrate on which it is placed. The device, as mentioned, does not require a mechanical fastening means and the adhesive pads are sufficient to retain the device in one place.

The printing of advertising indicia on the exterior surface of the legs of the device may take place either prior to assembly, i.e., while the printed sheet is in a blank condition, i.e., during manufacture, or the printed media may be applied as a sheet after the device has been assembled, in which case the sheet would be adhered to the exterior surface of the device by adhesive or a mechanical attachment such as a staple.

It will be noted that the invention does not require a great deal of cutting and fitting prior to assembly and need only be folded on the fold lines and the tabs inserted in the slotted portions of the base members as shown in FIGURES 3 and 4 above. Though it is preferable to ship the device prior to assembly due to the savings in space, the device may also be shipped in an assembled condition as shown in FIGURES 3 and 6. The device may be assembled with such ease that it does not require assembly prior to shipment as is required with more complex advertising apparatus.

Though the invention has been described with respect to two embodiments thereof, it will be noted that this is by way of illustration and not by way of limitation and the scope of the invention is defined solely by the appended claims which should be construed as broadly as is consistent with the prior art.

What is claimed is:

1. An advertising device that may be attached to a vehicle top without mechanical attaching means comprised of segments from a single sheet of folded material, said segments consisting of at least two leg members and at least one base member, said leg members meeting at an apex angle of approximately 45° and adapted to bear advertising indicia on the external surface thereof and joining the base member at an angle of approximately 45° to form a generally triangular-shaped device, said base member having interlocking means and adhesive attaching means associated therewith, said base member adapted to cooperate with said leg members to retain said device in a generally triangular shape, and said adhesive attaching means adapted to attach said device to a vehicle top.

2. The device of claim 1 wherein at least one of said base members has slots therein and a tabbed flap member on either end thereof and said flap members are adapted to fold inwardly on said base members and bow said leg members outwardly, and said tabs on said base members are adapted to fit within said slots on said base members to hold said members together and hold said device in a generally triangular shape.

3. A blank formed from a material selected from the group consisting of paper, plastic-coated paper, thermoplastics and metals, which blank may be utilized to assemble an advertising device, said blank comprised of at least four segments joining one another along fold lines, at least two of which segments are base segments with slots therein and are adapted to overlap each other to serve as a base section, and at least two of said segments being adapted to serve as legs of said device in its assembled condition and bear advertising indicia on the external surface thereof, at least one of said base segments having a tabbed flap member on either end thereof, said flap members adapted to fold upon said base members and said tabs thereon adapted to fit within said slots in said base members to assemble said device and retain said device in an assembled condition.

4. The device of claim 1 wherein the material making up the device is selected from the group consisting of cellulosic materials, thermoplastic materials, plastic-coated cellulosic materials, metals, combinations thereof and the like.

5. The blank of claim 3 wherein the adjoining leg segments and the base segments are adapted to form an elongated triangular shape and the base segments are adapted to be held together by staples when the blank is assembled as an advertising device.

References Cited

UNITED STATES PATENTS

| | | |
|---|---|---|
| 1,885,282 | 11/1932 | O'Connor. |
| 3,234,677 | 2/1966 | McDaniel et al. |
| 3,254,434 | 6/1966 | Gintoft. |
| 3,290,813 | 12/1966 | Rose. |
| 3,292,291 | 12/1966 | Kelley _____ 40—129 |

EUGENE R. CAPOZIO, Primary Examiner

WENCESLAO J. CONTRERAS, Assistant Examiner

U.S. Cl. X.R.

40—124.1